US009574920B2

(12) United States Patent
Enns

(10) Patent No.: US 9,574,920 B2
(45) Date of Patent: Feb. 21, 2017

(54) STORAGE AND MEASUREMENT CONTAINER

(71) Applicant: Linda Enns, Ontario (CA)

(72) Inventor: Linda Enns, Ontario (CA)

(*) Notice: Subject to any disclaimer, the term of this patent is extended or adjusted under 35 U.S.C. 154(b) by 0 days.

(21) Appl. No.: 14/578,144

(22) Filed: Dec. 19, 2014

(65) Prior Publication Data

US 2015/0122019 A1     May 7, 2015

Related U.S. Application Data

(63) Continuation-in-part of application No. 13/105,761, filed on May 11, 2011, now abandoned.

(60) Provisional application No. 61/334,609, filed on May 14, 2010.

(51) Int. Cl.
| | | |
|---|---|---|
| *G01F 11/00* | (2006.01) | |
| *G01F 11/02* | (2006.01) | |
| *A47G 19/34* | (2006.01) | |
| *B65D 25/52* | (2006.01) | |
| *B65D 83/06* | (2006.01) | |
| *A47J 43/25* | (2006.01) | |

(52) U.S. Cl.
CPC ............ *G01F 11/025* (2013.01); *A47G 19/34* (2013.01); *A47J 43/25* (2013.01); *B65D 25/52* (2013.01); *B65D 83/06* (2013.01)

(58) Field of Classification Search
CPC ........ G01F 19/00; G01F 11/261; G01F 11/00; G01F 11/006; A47G 19/34; B65D 83/06; B65D 25/52
USPC .............. 222/361, 143, 129, 561, 438–440
See application file for complete search history.

(56) References Cited

U.S. PATENT DOCUMENTS

| | | | | |
|---|---|---|---|---|
| 1,337,440 | A | * | 4/1920 | Clappison ............ G01F 11/282 222/307 |
| 1,471,621 | A | * | 10/1923 | McCord .................. A47K 5/10 222/243 |
| 2,162,286 | A | | 6/1939 | Siefert |
| 3,000,409 | A | | 9/1961 | Thomasco |
| 3,181,738 | A | | 5/1965 | Hartvig-Johansen |
| 3,201,008 | A | | 8/1965 | Morena |
| 3,315,843 | A | | 4/1967 | Tumbleson |
| 3,458,092 | A | | 7/1969 | McConnell |
| 3,754,688 | A | | 8/1973 | Colvin |
| 3,955,715 | A | * | 5/1976 | Topor ................. B65D 21/0204 222/143 |

(Continued)

*Primary Examiner* — Kevin P Shaver
*Assistant Examiner* — Robert Nichols, II
(74) *Attorney, Agent, or Firm* — Global Intellectual Property Agency, LLC; Daniel Boudwin

(57) ABSTRACT

A storage and measurement container for retaining a quantity of particulate material and dispensing a measured serving thereof. The container comprises an interior volume that is dividable into an upper volume and a lower volume via a slide, a sliding member that selectively occupies the lower volume, and a bottom lid for dispensing the contents of the lower volume. Pulling the slide and the sliding member out from the container causes granular material, such as flour or spices, to fall from the upper volume to the lower volume that is vacated by the sliding member. Measurement indicia on the slide corresponds to the amount of volume vacated by the sliding member. Once the desired amount of material has been deposited into the lower volume, the slide can be closed to seal the upper volume from the lower volume, and the contents of the lower volume can then be dispensed therefrom.

20 Claims, 4 Drawing Sheets

(56) References Cited

U.S. PATENT DOCUMENTS

| | | | |
|---|---|---|---|
| 3,973,704 A | 8/1976 | Horowitz | |
| 4,004,719 A * | 1/1977 | Weitzman | G01F 11/14 |
| | | | 141/373 |
| 4,039,118 A | 8/1977 | Kawaoka | |
| 4,219,136 A | 8/1980 | Williams et al. | |
| 4,601,213 A | 7/1986 | Kimball | |
| 4,646,948 A | 3/1987 | Jennings | |
| 5,556,011 A | 9/1996 | Jennings | |
| 6,634,525 B2 | 10/2003 | Bravo et al. | |
| 6,991,134 B2 * | 1/2006 | Bailey | A47J 43/22 |
| | | | 222/158 |

* cited by examiner

STORAGE AND MEASUREMENT CONTAINER

CROSS REFERENCE TO RELATED APPLICATION

This application is a continuation-in-part of U.S. patent application Ser. No. 13/105,761 filed on May 11, 2011, which claims the benefit of U.S. Provisional Application No. 61/334,609 filed on May 14, 2010. The above identified patent application are herein incorporated by reference in their entirety to provide continuity of disclosure.

FIELD OF THE INVENTION

The present invention relates to containers for particulate food stuffs. More particularly, the present invention relates to a combined storing, measuring, and dispensing device. The present invention pertains primarily with flowing particulate food stuffs, which may be assumed to encompass any granular, crystalline, particulate flake, powder, or similarly structured product that can flow from one vessel to another in solid form. This differs from fluid communicating devices or containers.

BACKGROUND OF THE INVENTION

Graduated measuring cups are well known in the art and provide a means to measure quantities of a product while preparing or serving food. These are generally singular or a set of graduated measuring devices with a visible measurement scale for reference along their interior or exterior surfaces, allowing a user to accurately measure a serving size or follow recipe instructions. These devices comprise stackable cups, spoons, cylinders and other structures whose sole purpose is to measure a quantity of food product and provide a dispensing means thereof.

Storage containers for granular food products such as spices, sugar and similar ingredients are likewise well described in the art. These devices are typically re-sealable containers that provide an air tight or vacuum seal lid for preserving interior contents for periods of time. The ability to adequately seal the contents slows any aerobic process that may result in spoilage or loss of freshness. These devices are generally formed of acrylic or similar plastic material with no means to accurately dispense a given quantity of product without use of a measuring device.

SUMMARY OF THE INVENTION

In view of the foregoing disadvantages inherent in the known types of storage and dispensing now present in the prior art, the present invention provides a storage and measurement container wherein the same can be utilized for providing convenience for the user when storing granular foodstuffs. The present system comprises a combination storage container, measurement, and dispensing device that provides all of the benefits of its individual components combined into a convenient and efficient structure. The present container comprises an interior volume that is dividable into an upper volume and a lower volume via a slide, a sliding member for selectively controlling the volume of the lower volume, and a bottom lid for dispensing the contents of the lower volume. Granular material, such as spices or flour, can be stored in the upper volume of the container with the slide and the sliding member in their closed positions. Pulling the slide and the sliding member out from the container causes granular material to fall from the upper volume to the portion of the lower volume that is vacated by the sliding member. Users can control the precise amount of material that is deposited into the lower volume because the slide has measurement indicia thereon corresponding to the amount of vacated volume. Once the desired amount of material has been deposited into the lower volume, the slide can be closed, and the slide and the sliding member can be locked in place to prevent them from moving. The contents of the lower volume can then be dispensed therefrom. The present invention provides users with a means to store and dispense specifically measured amounts of material in a convenient manner.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
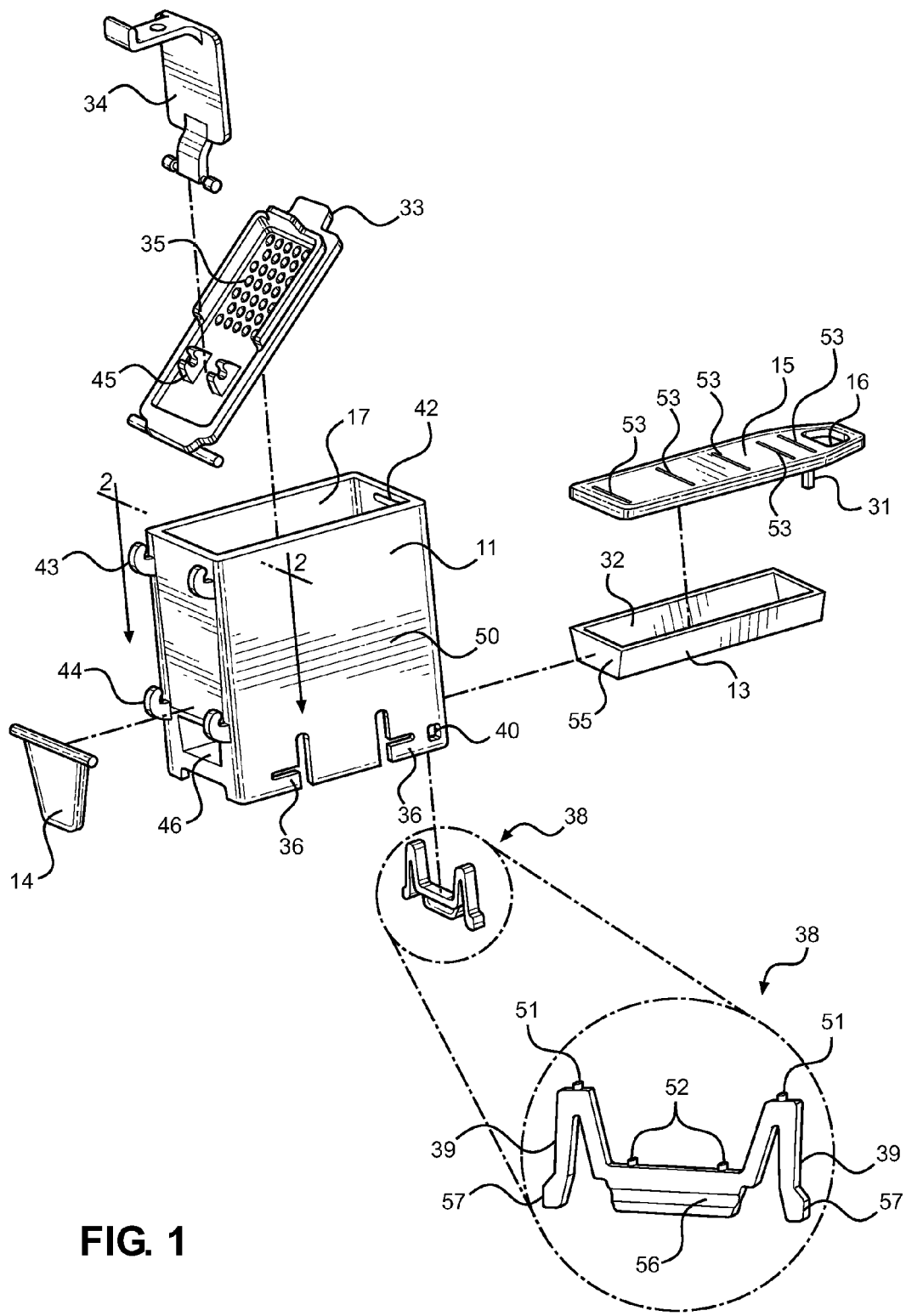
FIG. 1 shows an exploded view of the present invention.

Reference is made herein to the attached drawings. Like reference numerals are used throughout the drawings to depict like or similar elements of the storage and measurement container. For the purposes of presenting a brief and clear description of the present invention, the preferred embodiment will be discussed as used for storing granular food items, such as flour or spices. However, the present invention is adapted for use with any type of granular item and the present disclosure should not be read to be so limiting. The figures are intended for representative purposes only and should not be considered to be limiting in any respect.

Referring now to FIGS. 1, 2A-2C, and 4, there are shown a perspective view of the present invention, side views of the slide and sliding member in various positions, and a cross-sectional view of the present invention along line 2-2. The present invention comprises a container housing 11, a slide 15 adapted to selectively divide the interior volume of the housing 11 into an upper volume 17 and a lower volume 46, a member 13 slidably disposed within the lower volume 46, and one or more lids 14, 33 hingedly attached to the housing 11. The housing 11 generally defines a hopper wherein granular material, such as flour or spices, is loaded into the upper volume 17 through the upper open end and then may be dispensed from the lower volume 46, through the lower open end in controlled, measured quantities.

The slide 15 and the sliding member 13 are designed so that when the slide 15 is pulled outwardly from the container housing 11, the slide 15 pulls the sliding member 13 along with it. The movement of the slide 15 and the sliding member 13 travelling in unison simultaneously vacates a portion of the lower volume 46 and removes the barrier between the upper volume 17 and the lower volume 46, allowing the contents of the upper volume 17 to be communicated to the lower volume 46. However, when the slide 15 is pushed inwardly into the container housing 11, the slide 15 moves independently from the sliding member 13, allowing the slide 15 to seal the contents of the upper volume 17 from the contents that have occupied the portion of the lower volume 46 that has been vacated by the sliding member 13. The contents of the lower volume 46 can thereafter be dispensed from the container housing 11 without leakage of contents from the upper volume 17. Therefore, individuals can dispense measured serving sizes of granular contents from the present invention.

Figure 2A:
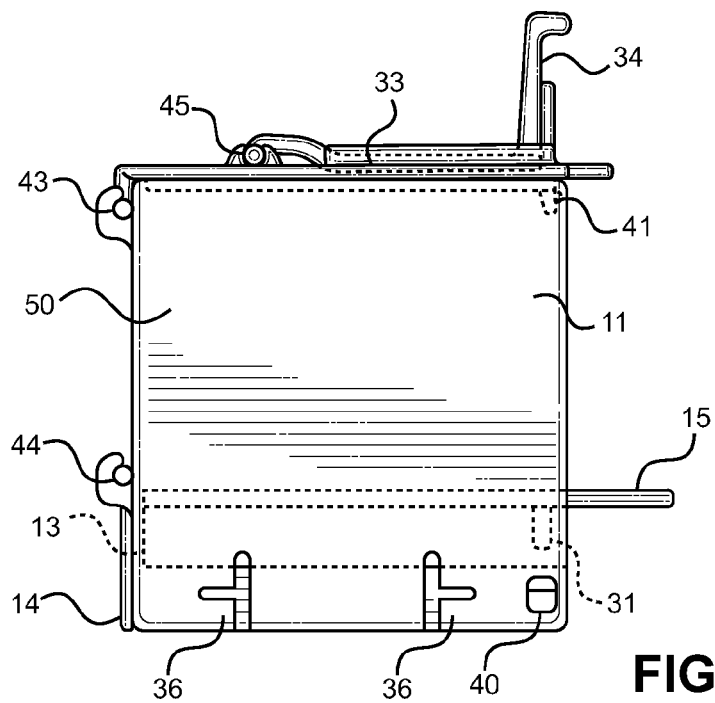
FIG. 2A shows a side view of the present invention with the slide and sliding member in a stowed position.
Figure 2B:
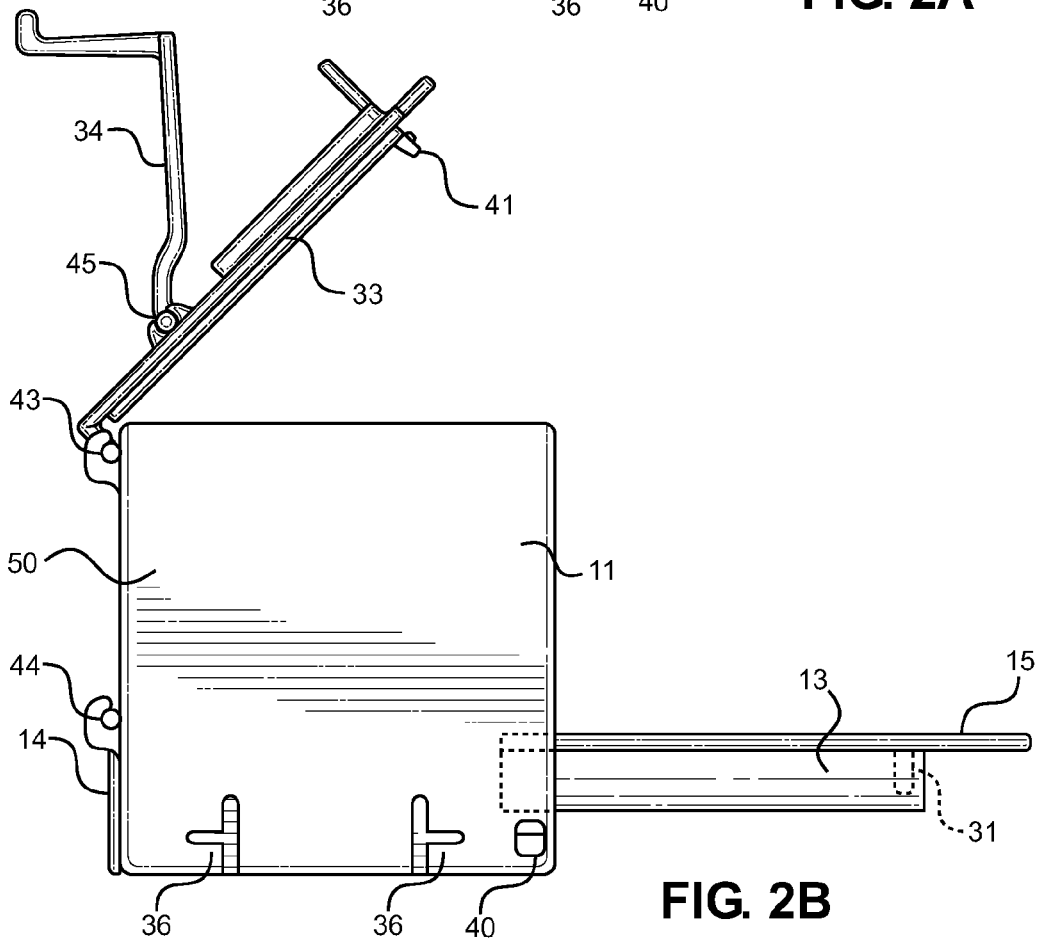
FIG. 2B shows a side view of the present invention with the slide and the sliding member in an extended position.

The slide 15 comprises a lower surface that rests flush against the sliding member 13 disposed therebelow and one or more projections 31 extending from the lower surface. The sliding member 13 comprises a hollow interior 32 defined by one or more interior sidewalls and an open top. The projections 31 of the slide 15 rest within the hollow interior volume 32 of the sliding member 13. From a position in which both the slide 15 and sliding member 13 are stowed, as shown in FIG. 2A, a user can grip a handle 16 or lip disposed on the slide 15 and pull the slide 15 from the container housing 11. As the slide 15 is actuated, the projections 31 bear against the interior sidewalls of the sliding member 13, causing the sliding member 13 to be pulled from the container housing 11 in unison with the slide 15. The engagement between the slide 15 and the sliding member 13 allows the lower volume 46 to be simultaneously exposed to the upper volume 17 and a portion of the lower volume to be vacated by the sliding member 13, as shown in FIG. 2B. Thus, contents contained within the upper volume 17 are communicated to the portion of the lower volume 46 that is vacated by the sliding member 13.

Figure 2C:
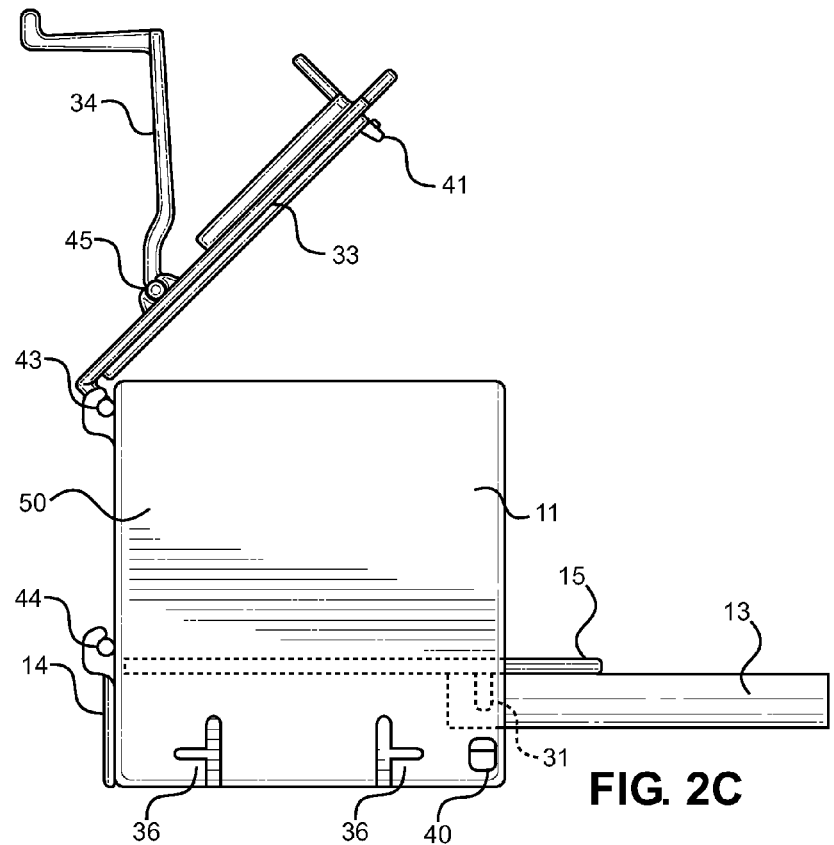
FIG. 2C shows a side view of the present invention with the slide in a stowed position and the sliding member in an extended position.

The volume of the portion of the lower volume 46 that is vacated by the sliding member 13 is indicated by measurement indicia 53 disposed on the slide 15. Furthermore, once the granular contents have filled the portion of the lower volume 46 that is vacated by the sliding member 13, the slide 15 can be closed, as shown in FIG. 2C, to divide the contents of the lower volume 46 and the upper volume 17 and prevent any leakage therebetween. When the slide 15 is pushed into the container housing 11, it moves independently from the sliding member 13 because the projections 31 freely travel through the hollow interior 32 of the sliding member 13 without bearing against the interior sidewalls. Because the slide 15 can be closed to seal the upper volume 17 from the lower volume 46, without affecting the position of the sliding member 13, users are able to dispense the precise amount of the contents that they desire. The measurement indicia 53 comprise any graduated scale, such as teaspoons or cups, and any fractional values thereof.

The slide 15 is a planar member that is slidably disposed upon one or more ridges 48 disposed within the interior volume of the container housing 11. The ridges 48 extend along the longitudinal axis of the container housing 11, along the top edge of the sloped sidewalls 47 of the lower volume 46. This allows the slide 15 to be transitioned between a stowed or closed position in which it divides the interior volume of the container into an upper volume 17 thereabove and a lower volume 46 therebelow. However, no claim is made as to the precise means by which the slide 15 is slidably disposed within the container housing 11.

The sliding member 13 comprises a base 55 having an area equal to the cross-sectional area of the lower volume 46 within a close tolerance, such that it prevents the granular contents of the lower volume 46 from leaking past it, while still being able to slide between a closed or stowed position and an open or extended position. In the depicted embodiment of the present invention, the lower volume 46 and the sliding member 13 have the shape of a trapezoidal prism; however, no claim is made as to the precise shapes of the lower volume 46 or the sliding member 13.

The present invention further comprises a lock 38 that is insertable into the container housing 11 to hold the slide 15 and the sliding member 13 securely in place, preventing these components from moving when material is being dispensed from the container housing 11. The lock 38 comprises a body 56 and one or more semi-rigid arms 39 connected to the body 56. The semi-rigid arms 39 further comprise raised distal ends 57 that are adapted to engage with complementary apertures 40 disposed on the container housing 11. When the lock 38 is inserted into the container housing 11, the semi-rigid arms 39 compress to allow the lock 38 to pass between the sidewalls 49, 50 of the container housing 11. The semi-rigid arms 39 are biased so that the distal ends 57 of the arms 39 engage with the complementary apertures 40 when they pass thereover, holding the lock 38 securely in place. The lock 38 further comprises one or more first projections 51 extending from the arms 39 and one or more second projections 52 extending from the body 56. When the lock 38 is secured in place via engagement between its distal ends 57 and the apertures 40, the first projections 51 bear against the bottom surface of the slide 15, sandwiching the slide 15 between the lock 38 and the container housing 11 and thereby fixedly holding the slide 15 in place. Likewise, the when the lock 38 is secured in place, the second projections 52 bear against the bottom surface of the sliding member 13, sandwiching the sliding member 13 between the lock 38 and the slide 15 and thereby fixedly holding the sliding member 13 in place. The lock 38 can be disengaged from the container housing 11 by pressing on the distal ends 57 to compress the semi-rigid arms 39, disengaging them from the apertures 40 and allowing the lock 38 can be removed therefrom.

The present invention further comprises one or more lids 14, 33 attached to the container housing 11 for selectively covering the open ends thereof. A dispensing lid 14 is hingedly connected 44 to the container housing 11 at the lower open end. A top lid 33 is hingedly connected 43 to the container housing 11 at the upper open end. The top lid 33 controls the administration of contents into and from the upper volume 17 of the container housing 11. The dispensing lid 14 controls the dispensation of contents from the lower volume 46. The lids 14, 33 further comprise locks adapted to hold the lids 14, 33 closed to prevent leakage of granular material from the present invention. For example, in the depicted embodiment of the present invention, the top lid 33 comprises a semi-rigid tab 41 extending the distal end thereof that is adapted to engage with a complementary aperture disposed on the container housing 11. The dispensing lid 14 likewise comprises such a mechanism. However, no claim is made as to the precise means by which the lids 14, 33 are locked in place.

In an alternative embodiment, the top lid 33 comprises a porous surface 35 disposed thereon and a secondary lid 34 that is hingedly connected 45 thereto. The secondary lid 34 is adapted to transition between a position in which it covers the porous surface 35, preventing the contents of the upper volume 17 from being communicated therethrough, and an open position. The porous surface 35 provides users with a means to dispense the granular contents of the upper volume 17, while still allowing the top lid 33 to remain secured in place in order to prevent the entire contents of the upper volume 17 to spill therefrom. The secondary lid 35 is securable to the top lid 33 via similar means as discussed above for securing the dispensing lid 14 and the top lid 33 to the container housing 11. In an exemplary embodiment of the present invention, the secondary lid 34 is securable to the top lid 33 via engagement between a semi-rigid tab disposed on the secondary lid 34 and a complementary aperture disposed on the top lid 33.

Figure 3:
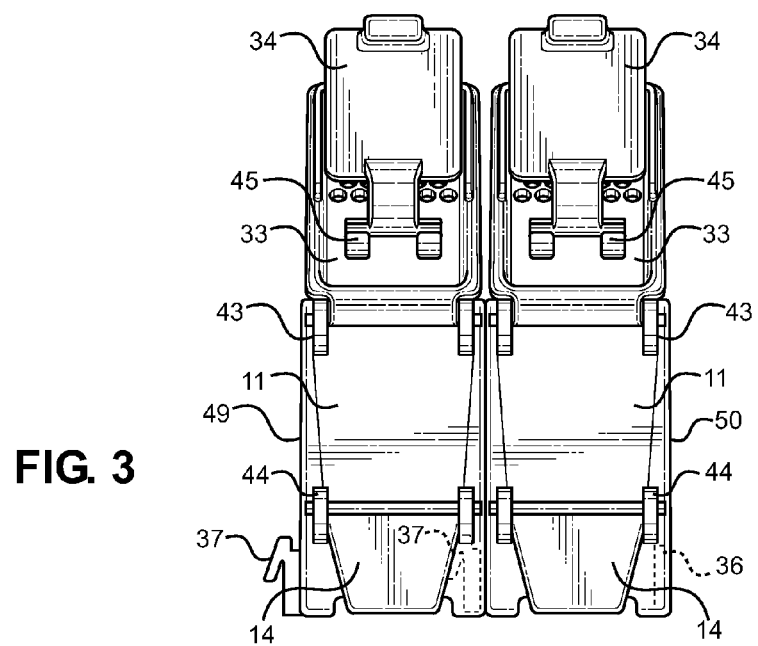
FIG. 3 shows an end view of the multiple units of the present invention connected together.
Figure 4:
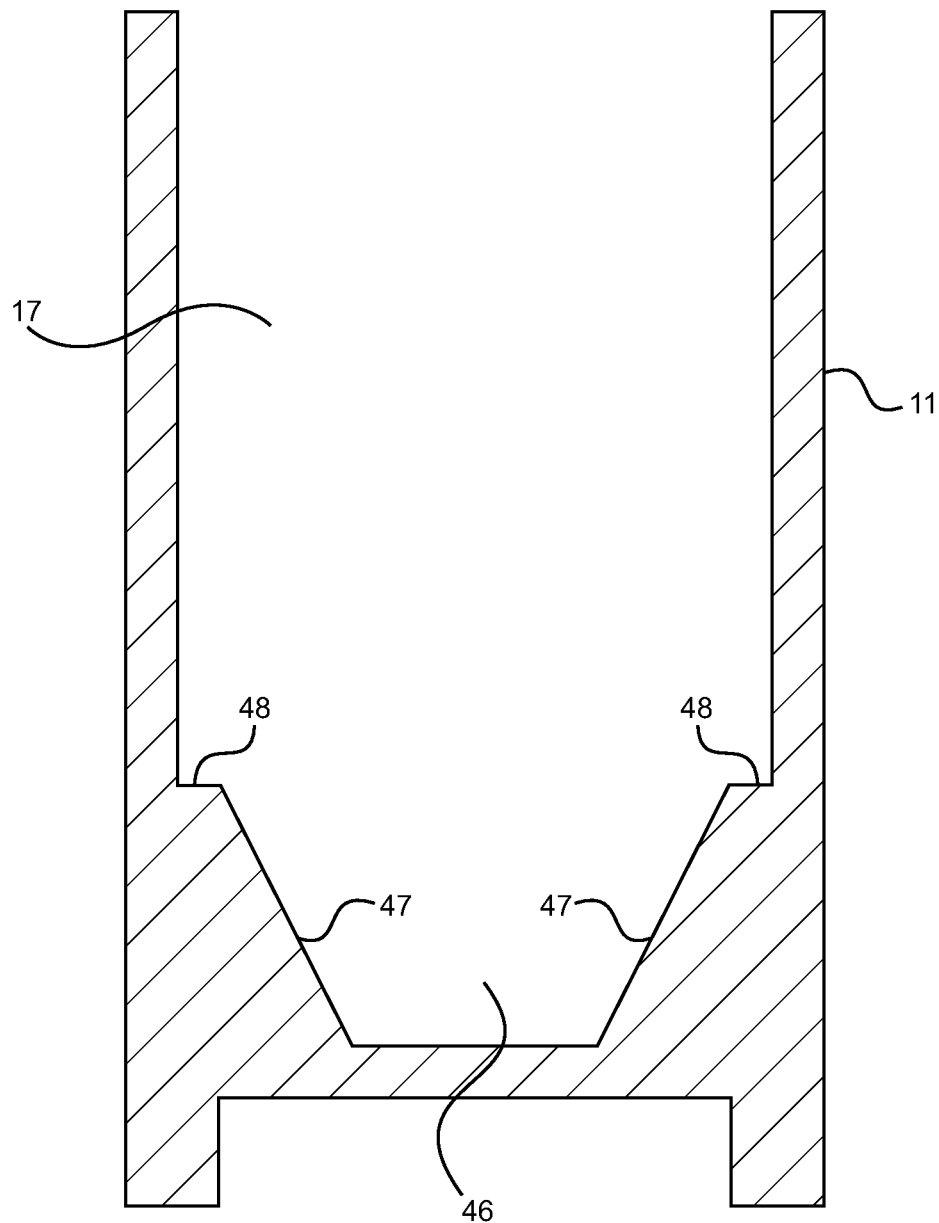
FIG. 4 shows a cross-sectional view of the container housing along line 2-2.

Referring now to FIG. 3, there is shown an end view of the multiple units of the present invention connected together. The present invention further comprises one or more connectors 37 disposed on a first side 49 of the container housing 11 and a complementary number of slots 36 disposed on a second side 50 of the container housing 11. The slots 36 and connectors 37 are adapted to engage together, thereby allowing multiple units of the present invention to be secured together in series for ease of use and storage. In the depicted embodiment of the present invention, the connectors comprise semi-rigid tabs that are adapted to snap into or otherwise engage with the complementary slots 36.

In use, the present invention provides an easy to use and efficient method of measuring a quantity of food stuffs from a container and dispensing it therefrom. The slide 15 with graduated measurement indicia 53 thereon allows contents to be measured prior to delivery, while the remainder of the contents are securely housed within the container housing 11 and prevented from spilling out. The ability to measure out material within the container itself eliminates any problems associated with transferring granular materials between separate containers for storage and measurement. Food products contemplated for use with this product include any household food product that requires measurement or one that is stored in a sealable container prior to use, including flour, spices, sugar, cereal, oats or any other similar flowable solid material composition.

Materials for the device may be chosen from any known materials used for food storage, including acrylic and other plastics, stainless steel, and aluminum. In an embodiment of the present invention, the container housing 11 is composed of transparent acrylic so that a user may view the contents of the container housing 11. It is not intended to limit the present invention to a specific material type, but rather it has been shown that this material yields a device that allows for ease of use, ease of cleaning and improved manufacturability.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A container, comprising:
a housing comprising an interior volume, an upper open end, and a lower open end;
a slide separating the interior volume into an upper volume and a lower volume;
a member slidably disposed within the lower volume;
wherein the slide and the member are adapted to move in cooperation when the slide is pulled from the housing;
wherein the slide is adapted to slide independently of the member when the slide is pushed into the housing;
measurement indicia disposed on the slide;
the measurement indicia corresponding to an amount of the lower volume that is unoccupied by the member;
a dispensing lid disposed over the lower open end;
a first lock comprising one or more semi-rigid arms, one or more first projections, and one or more second projections;
the semi-rigid arms adapted to engage with one or more apertures disposed on the housing, holding the first lock in a static position;
wherein the one or more first projections impinge upon the slide, holding the slide in a static position; and
wherein the one or more second projections impinge upon the member, holding the member in a static position.

2. The container of claim 1, wherein:
the slide comprising an upper side and a lower side;
one or more projections extending from the lower side of the slide;
the member comprising a hollow interior volume defined by one or more interior sidewalls and an open top;
wherein pulling of the slide from the housing causes the one or more projections to bear against the interior sidewalls of the member.

3. The container of claim 1, further comprising:
the housing comprising a first side and a second side;
one or more connectors disposed on the first side;
one or more slots disposed on the second side;
wherein the slots are adapted to engage with the connectors, thereby allowing multiple containers to be connected in series.

4. The container of claim 1, further comprising:
a top lid disposed over the upper open end.

5. The container of claim 4, further comprising:
a porous surface disposed on the top lid;
a secondary lid disposed on the top lid adapted to selectively cover the porous surface.

6. The container of claim 4, wherein:
the top lid comprising a second lock.

7. The container of claim 6, wherein:
the second lock of the top lid comprising a semi-rigid tab disposed on the top lid that is adapted to engage with a complementary slot disposed on the housing.

8. The container of claim 1, wherein:
the dispensing lid comprising a third lock.

9. The container of claim 8, wherein:
the third lock of the dispensing lid comprising a semi-rigid arm disposed on the dispensing lid that is adapted to engage with a complementary slot disposed on the housing.

10. The container of claim 1, wherein:

a cross-sectional area of the lower volume is equal to a cross-sectional area of the member within a close tolerance.

11. The container of claim 1, wherein:

the lower volume comprising a trapezoidal prism shape;

the member comprising a trapezoidal prism shape;

wherein a cross-sectional area of the lower volume is equal to an area of a base of the member within a close tolerance.

12. The container of claim 1, further comprising:

one or more ridges disposed within the interior volume of the housing along which the slide is slidably disposed.

13. The container of claim 1, wherein:

the container is composed of transparent acrylic material.

14. A container, comprising:

a housing comprising an interior volume, an upper open end, and a lower open end;

a slide separating the interior volume into an upper volume and a lower volume;

a member slidably disposed within the lower volume;

wherein the slide and the member are adapted to move in cooperation when the slide is pulled from the housing;

wherein the slide is adapted to slide independently of the member when the slide is pushed into the housing;

measurement indicia disposed on the slide;

the measurement indicia corresponding to an amount of the lower volume that is unoccupied by the member;

a dispensing lid disposed over the lower open end; and the dispensing lid comprising a first lock, the first lock comprising a semi-rigid arm disposed on the dispensing lid that is adapted to engage with a complementary slot disposed on the housing.

15. The container of claim 14, wherein:

the slide comprising an upper side and a lower side;

one or more projections extending from the lower side of the slide;

the member comprising a hollow interior volume defined by one or more interior sidewalls and an open top;

wherein pulling of the slide from the housing causes the one or more projections to bear against the interior sidewalls of the member.

16. The container of claim 14, further comprising:

a second lock adapted to secure the slide and the member in a static position.

17. The container of claim 14, further comprising:

a second lock comprising one or more semi-rigid arms, one or more first projections, and one or more second projections;

the semi-rigid arms adapted to engage with one or more apertures disposed on the housing, holding the second lock in a static position;

wherein the one or more first projections impinge upon the slide, holding the slide in a static position; and wherein the one or more second projections impinge upon the member, holding the member in a static position.

18. The container of claim 14, further comprising:

the housing comprising a first side and a second side;

one or more connectors disposed on the first side;

one or more slots disposed on the second side;

wherein the slots are adapted to engage with the connectors, thereby allowing multiple containers to be connected in series.

19. The container of claim 14, wherein:

the lower volume comprising a trapezoidal prism shape;

the member comprising a trapezoidal prism shape;

wherein a cross-sectional area of the lower volume is equal to an area of a base of the member within a close tolerance.

20. The container of claim 14, further comprising:

one or more ridges disposed within the interior volume of the housing along which the slide is slidably disposed.

* * * * *